US012422813B2

(12) United States Patent
Butitta

(10) Patent No.: US 12,422,813 B2
(45) Date of Patent: Sep. 23, 2025

(54) CONTROLLER-BASED MACHINE TOOL SYSTEM AND METHOD OF MACHINING WOOD SLAT ARCHITECTURAL PANELS

(71) Applicant: Henry Butitta, Shoreline, WA (US)

(72) Inventor: Henry Butitta, Shoreline, WA (US)

( * ) Notice: Subject to any disclaimer, the term of this patent is extended or adjusted under 35 U.S.C. 154(b) by 392 days.

(21) Appl. No.: 18/121,016

(22) Filed: Mar. 14, 2023

(65) Prior Publication Data

US 2024/0310808 A1   Sep. 19, 2024

(51) Int. Cl.
*G05B 19/19* (2006.01)
*G05B 19/4097* (2006.01)
*G05B 19/418* (2006.01)
*B27M 3/00* (2006.01)

(52) U.S. Cl.
CPC .............. *G05B 19/19* (2013.01); *B27M 3/00* (2013.01); *G05B 19/4097* (2013.01); *G05B 19/418* (2013.01); *G05B 19/41865* (2013.01); *G05B 2219/45229* (2013.01); *G05B 2219/49346* (2013.01)

(58) Field of Classification Search
CPC .. G05B 19/19; G05B 19/418; G05B 19/4097; G05B 19/41865; G05B 2219/45229; G05B 2219/49346
USPC ........................................................ 700/167
See application file for complete search history.

(56) References Cited

U.S. PATENT DOCUMENTS

| | | | |
|---|---|---|---|
| 5,590,046 A * | 12/1996 | Anderson | G05B 19/4184 700/122 |
| 11,691,310 B2 * | 7/2023 | Jin | G05B 19/41815 83/79 |
| 11,865,659 B2 * | 1/2024 | Rivers | B23B 49/00 |

FOREIGN PATENT DOCUMENTS

| | | | | |
|---|---|---|---|---|
| DE | 202015009829 U1 * | 8/2020 | | G05B 19/4205 |
| EP | 2969385 B1 * | 11/2018 | | B23B 3/02 |
| EP | 3515628 B1 * | 4/2025 | | B21D 28/06 |
| WO | WO-2018055178 A1 * | 3/2018 | | B21D 28/06 |

* cited by examiner

*Primary Examiner* — Ronald D Hartman, Jr.
(74) *Attorney, Agent, or Firm* — Alloy Patent Law; Walker Griffin Weitzel

(57) ABSTRACT

The present disclosure relates to a controller-based machine tool system configured for machining a flat elongated workpiece. The controller-based machine tool system includes a tool assembly having a spindle for machining a customized design pattern in the flat elongated workpiece. A spindle motor is configured to provide rotational power to the spindle. A power assembly is configured to provide linear movement of the spindle and a spindle control unit is configured for controlling the power assembly. A controller is electrically connected to the spindle control unit, wherein the controller is configured to generate a customized design pattern for the flat elongated workpiece. An infeed station and an outfeed station are configured to linearly move the flat elongated workpiece.

35 Claims, 10 Drawing Sheets

CONTROLLER-BASED MACHINE TOOL SYSTEM AND METHOD OF MACHINING WOOD SLAT ARCHITECTURAL PANELS

BACKGROUND OF THE INVENTION

The present invention relates to a controller-based machine tool system as well as a method of using the controller-based machine tool system, and more particularly, the present invention relates to a computer numerical controlled (CNC) router system as well as an automated method of machining flat elongated workpieces by using the computer numerical controlled (CNC) router.

BACKGROUND

Wood slat architectural panels, also referred to as wooden slat facades are commonly used in high-end architectural applications. The wood slat architectural panels assemble to cover large areas of architectural surfaces with closely spaced rows of wood boards, often oriented 'on edge' to create visual depth. A wood slat architectural panel system can cover areas of thousands of square feet, comprising a plurality of boards.

A typical wood slat architectural panel is made of a material such as plywood or pine that is machined into the desired shape and size by using a table saw machine. Some of wood slat architectural panel systems further include custom design patterns along the front-facing edge of the wood slat architectural panels. This custom design pattern on the face of the wood slat architectural panels can result in textural or graphical patterns in relief in the completed assembly. The added labor required to customize the design and fabrication of these systems significantly increases the cost of the product by three to four times, which is not economically feasible for the user.

Various automated solutions exist in the prior art that are related to customized wood slat architectural panel systems. The existing automated solutions utilize a conventional computer numerical controlled (CNC) machine that is a motorized maneuverable tool and often a motorized maneuverable platform, which are both controlled by a computer, according to specific input instructions. Instructions are delivered to the CNC machine in the form of a sequential program of machine control instructions such as G-code and M-code, and then executed. The program can be written by a person or, far more often, generated by graphical computer-aided design (CAD) or computer-aided manufacturing (CAM) software. In the case of 3D printers, the part to be printed is "sliced" before the instructions (or the program) are generated. 3D printers also use G-Code.

The prior art solutions related to customized wood slat architectural panel systems are using generalized design processes and machinery, requiring significant labor and handling, and allowing greater opportunity to introduce human error via repetitive tasks.

Generally, for fabrication of wood slat architectural panel systems, the wood slat architectural panels are typically machined on traditionally formatted CNC router machines, such as 3-axis bed and gantry machines. Locating hold-downs for the wood slat architectural panels on a traditionally formatted CNC router machine can be difficult and can change from part to part because of varying widths, lengths, and machining patterns required in these custom wood slat architectural panel systems. This results in significant setup times, and a large amount of handling, and requires an experienced and organized machine operator to avoid failures.

For designing of the customized wood slat architectural panel systems, the prior art does not automate the production of labeled and dimensioned shop drawings as well as machine files ready to be executed (run). Larger assemblies include thousands of boards, which can create massive labor requirements and opportunities for human error when each board requires manual manipulation for documentation and programming for CNC machining.

The existing prior art solutions related to customized wood slat architectural panel systems are ineffective and/or inefficient as the existing prior art solutions fail to significantly reduce machining time, could lead to human error, as well as reduce manufacturing costs associated with machining. Further, the existing prior art solutions related to customized wood slat architectural panel systems require a highly skilled machine operator to ensure high precision while machining the wood slat architectural panel systems.

There is a need for an effective and efficient system as well as a method that solves the aforementioned problems of existing prior art solutions in customizing the wood slat architectural panel systems.

Thus, a new computer numerical controlled (CNC) router system as well as an automated method of machining flat elongated workpieces in the form of wood slat architectural panels by using the new computer numerical controlled (CNC) router are proposed that solves the aforementioned problems of the existing prior art solution.

SUMMARY

While the way that the present disclosure addresses the disadvantages of the prior art will be discussed in greater detail below, in general, the present disclosure provides a new computer numerical controlled (CNC) router system as well as an automated method of machining flat elongated workpieces in the form of wood slat architectural panels by using the new computer numerical controlled (CNC) router.

The present disclosure overcomes the drawbacks of the existing devices by providing a controller-based machine tool system positioned in an X-Y-Z axis space and configured for machining an flat elongated workpiece, the controller-based machine tool system comprising: a tool assembly comprising a spindle configured to be rotated around Z axis for machining a customized design pattern in the flat elongated workpiece; a spindle motor configured to provide rotational power to the spindle; a power assembly configured to provide linear movement of the spindle along Y-axis; and a spindle control unit configured for controlling the power assembly; wherein the tool assembly further comprises a trigger switch mechanism that is electrically connected to the spindle control unit; wherein the trigger switch mechanism is configured to be activated upon detection of a leading edge of the flat elongated workpiece with the trigger switch mechanism; a controller electrically connected to the spindle control unit; wherein the controller is configured to generate a customized design pattern for the flat elongated workpiece; an infeed station configured to linearly move an flat elongated workpiece along X-axis in a substantially linear passage towards the tool assembly; wherein the infeed station comprises at least one roller rotating along Y-axis; an outfeed station configured to linearly move an flat elongated workpiece along X-axis in a substantially linear passage away from the tool assembly; wherein the outfeed station comprises atleast one roller rotating along Y-axis.

In an embodiment, the flat elongated workpiece is a wood slat architectural panel.

In an embodiment, the power assembly comprises a motor-controlled power screw assembly.

In an embodiment, the motor-controlled power screw assembly comprises a Y-axis motor, a power screw, a mounting block, a power screw nut, a linear rail arrangement comprising a plurality of slide rails, a bearing element, a plurality of power screw end supports, and a slidable carriage.

In an embodiment, the power assembly comprises a linear actuator selected from the group consisting of rack and pinion gear actuator, cam actuator, hydraulic actuator, pneumatic actuator, piezoelectric actuator, an electro-mechanical actuator, linear motors, telescoping linear actuator and piston-cylinder actuator.

In an embodiment, the tool assembly comprising a second spindle motor configured for providing a surface finishing effect of the roughly machined flat elongated workpiece.

In an embodiment, the tool assembly comprises a dust-collection fitting for collecting debris arising from the machining of the flat elongated workpiece.

In an embodiment, the trigger switch mechanism comprises a board location sensor configured to detect the leading edge of the flat elongated workpiece in a non-contact manner.

In an embodiment, the trigger switch mechanism comprises a limit switch configured to mechanically contact with the leading edge of the flat elongated workpiece.

In an embodiment, the tool assembly comprises a workpiece hold down assembly to effectively clamp the flat elongated workpiece while the flat elongated workpiece is linearly moving along an X-axis in a substantially linear passage.

In an embodiment, the infeed station comprises at least one spring-loaded idler wheel.

In an embodiment, the outfeed station comprises at least one spring-loaded idler wheel.

In an embodiment, the rollers of the infeed station is rotationally driven by an electric motor.

In an embodiment, the rollers of the outfeed station is rotationally driven by an electric motor.

In an embodiment, the controller comprises an input unit, a processor unit, and the output unit.

In an embodiment, the processor unit include a custom design software that imports a digital surface that represents the customized design pattern to be revealed in the final installation, along with curves that define panel boundaries.

In an embodiment, the custom design software is configured to generate a number of digital resources.

Embodiments of the present invention disclose a customized flat elongated workpiece obtained by a process comprising the steps of: providing a controller-based machine tool system positioned in an X-Y-Z axis space that comprises a tool assembly, an infeed station, an outfeed station and a controller; generating a customized design pattern for the flat elongated workpiece in the controller; arranging a flat elongated workpiece in an infeed station; enabling the infeed station to linearly move an flat elongated workpiece along X-axis in a substantially linear passage towards a tool assembly; wherein linear movement of the flat elongated workpiece along X-axis in a substantially linear passage towards the tool assembly enables detection of a leading edge of the flat elongated workpiece with a trigger switch mechanism of the tool assembly; thereby activating the trigger switch mechanism; wherein the activation of the trigger switch mechanism enables the workpiece hold down assembly to effectively clamp against the flat elongated workpiece while the flat elongated workpiece is linearly moving along X-axis in a substantially linear passage; wherein the activation of the trigger switch mechanism further enables the spindle control unit to control the power assembly and linearly move the rotating spindle along y-axis in a pattern that corresponds to the customized design pattern generated in the controller for machining the flat elongated workpiece linearly moving along X-axis in a substantially linear passage; thereby providing a customized flat elongated workpiece receiving the customized flat elongated workpiece linearly moving along X-axis in a substantially linear passage in the outfeed station; enabling the outfeed station to linearly move the customized flat elongated workpiece along X-axis in a substantially linear passage away from the tool assembly for later use.

In an embodiment, the infeed station comprises at least one roller rotating along Y-axis.

In an embodiment, the outfeed station comprises at least one roller rotating along Y-axis.

In an embodiment, the flat elongated workpiece is a wood slat architectural panel.

In an embodiment, the power assembly comprises a motor-controlled power screw assembly.

In an embodiment, the motor-controlled power screw assembly comprises a Y-axis motor, a power screw, a mounting block, a power screw nut, a linear rail arrangement comprising a plurality of slide rails, a bearing element, a plurality of power screw end supports, and a slidable carriage.

In an embodiment, the power assembly comprises a linear actuator selected from a group consisting of: rack and pinion gear actuator, cam actuator, hydraulic actuator, pneumatic actuator, piezoelectric actuator, electro-mechanical actuator, linear motors, telescoping linear actuator and piston-cylinder actuator.

In an embodiment, the tool assembly comprising a second spindle motor configured for providing a surface finishing effect of the roughly machined flat elongated workpiece.

In an embodiment, the tool assembly comprises a dust-collection fitting for collecting debris arising from the machining of the flat elongated workpiece.

In an embodiment, the trigger switch mechanism comprises a board location sensor configured to detect the leading edge of the flat elongated workpiece in a non-contact manner.

In an embodiment, the trigger switch mechanism comprises a limit switch configured to mechanically contact with the leading edge of the flat elongated workpiece.

In an embodiment, the infeed station comprises at least one spring-loaded idler wheel.

In an embodiment, the outfeed station comprises at least one spring-loaded idler wheel.

In an embodiment, the rollers of the infeed station is rotationally driven by an electric motor.

In an embodiment, the rollers of the outfeed station is rotationally driven by an electric motor.

In an embodiment, the controller comprises an input unit, a processor unit and the output unit.

In an embodiment, the processor unit includes a custom design software that imports a digital surface that represents the customized design pattern to be revealed in the final installation, along with curves that define panel boundaries.

In an embodiment, the custom design software is configured to generate a number of digital resources.

The present disclosure overcomes the drawbacks of the existing devices by providing a new computer numerical controlled (CNC) router system as well as an automated method of machining flat elongated workpieces in the form of wood slat architectural panels by using the new computer numerical controlled (CNC) router.

BRIEF DESCRIPTION OF THE DRAWINGS

A more complete understanding of the present disclosure may be derived by referring to the detailed description and claims when considered in connection with the Figures, wherein like reference numerals refer to similar elements throughout the figures.

DETAILED DESCRIPTION

The following description is of exemplary embodiments of the invention only, and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms and the like and still fall within the scope of the present invention. Thus, the detailed description herein is presented for purposes of illustration only and not of limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The controller-based machine tool system will now be described with reference to the accompanying drawings, particularly FIGS. 1-10.

Figure 1:
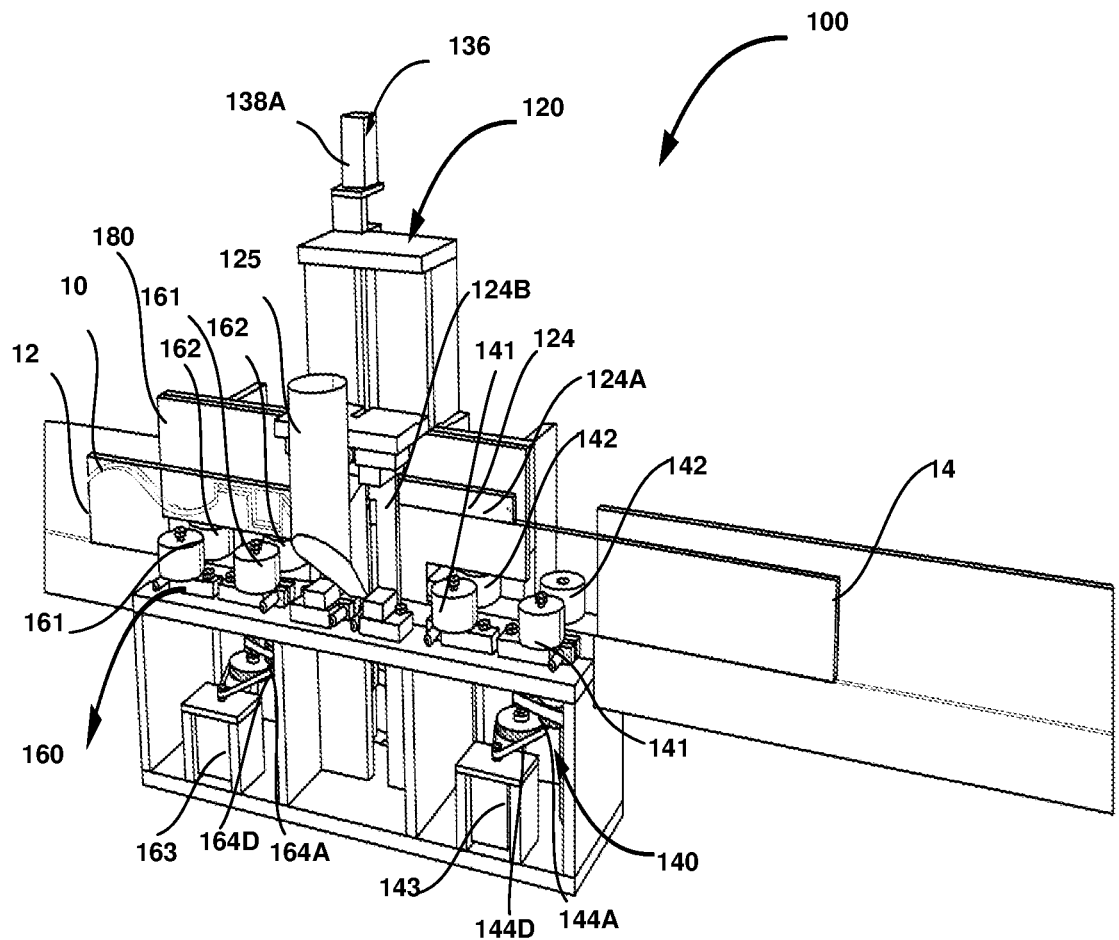
FIG. 1 is a front perspective view of a controller-based machine tool system, according to an embodiment of the present invention.
Figure 1:
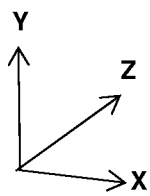
Figure 2:
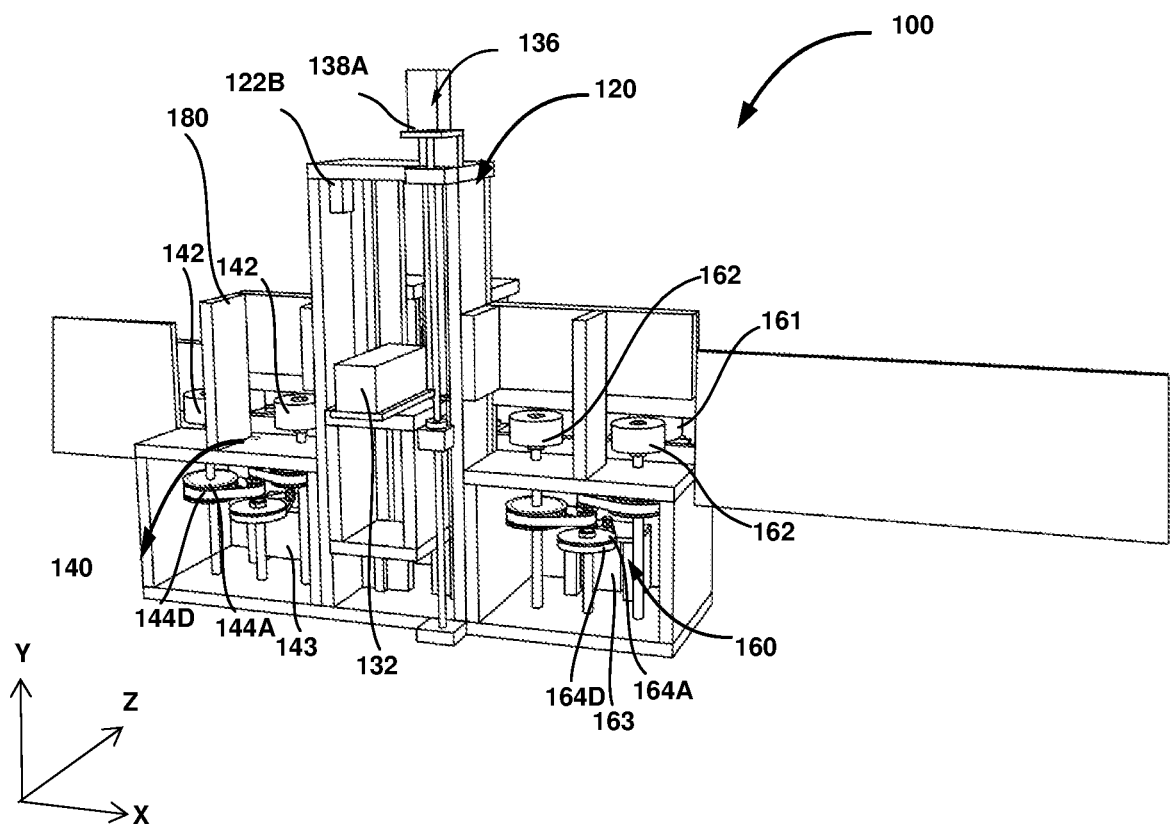
FIG. 2 is a back perspective view of a controller-based machine tool system, according to an embodiment of the present invention.
Figure 3:
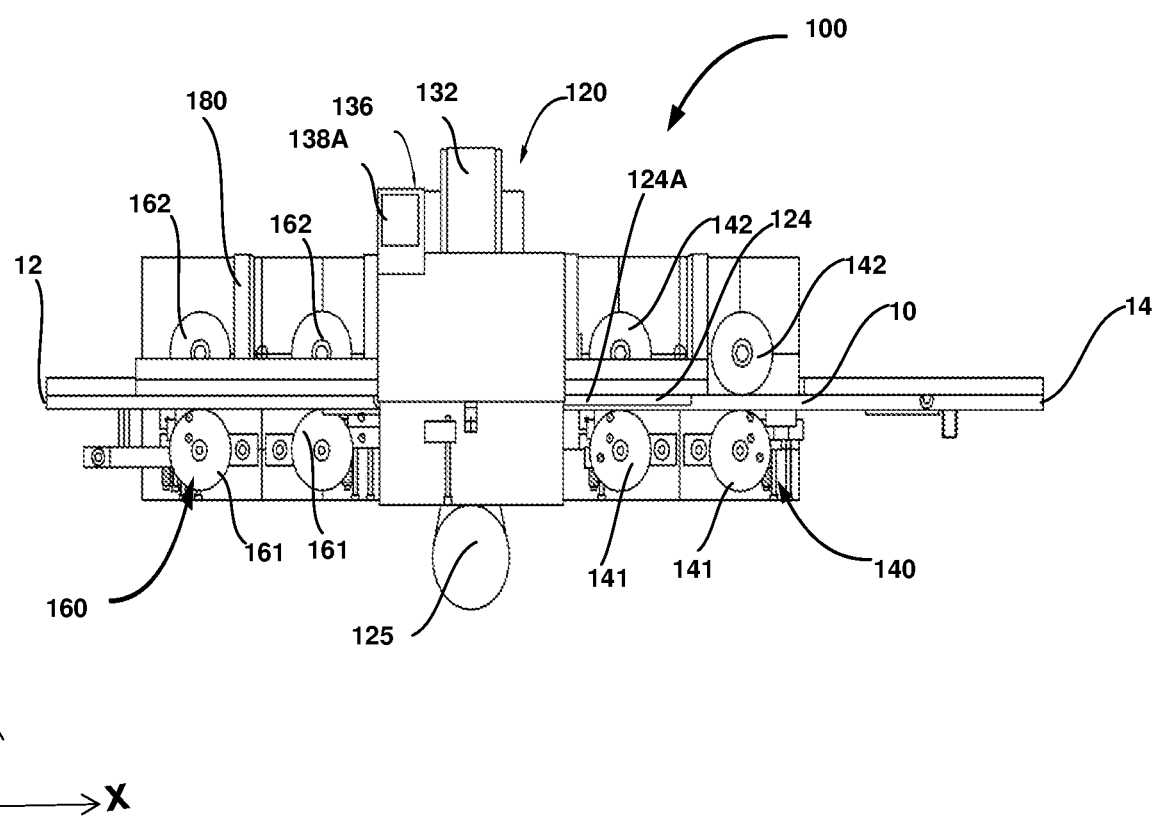
FIG. 3 is a top view of a controller-based machine tool system, according to an embodiment of the present invention.
Figure 4:
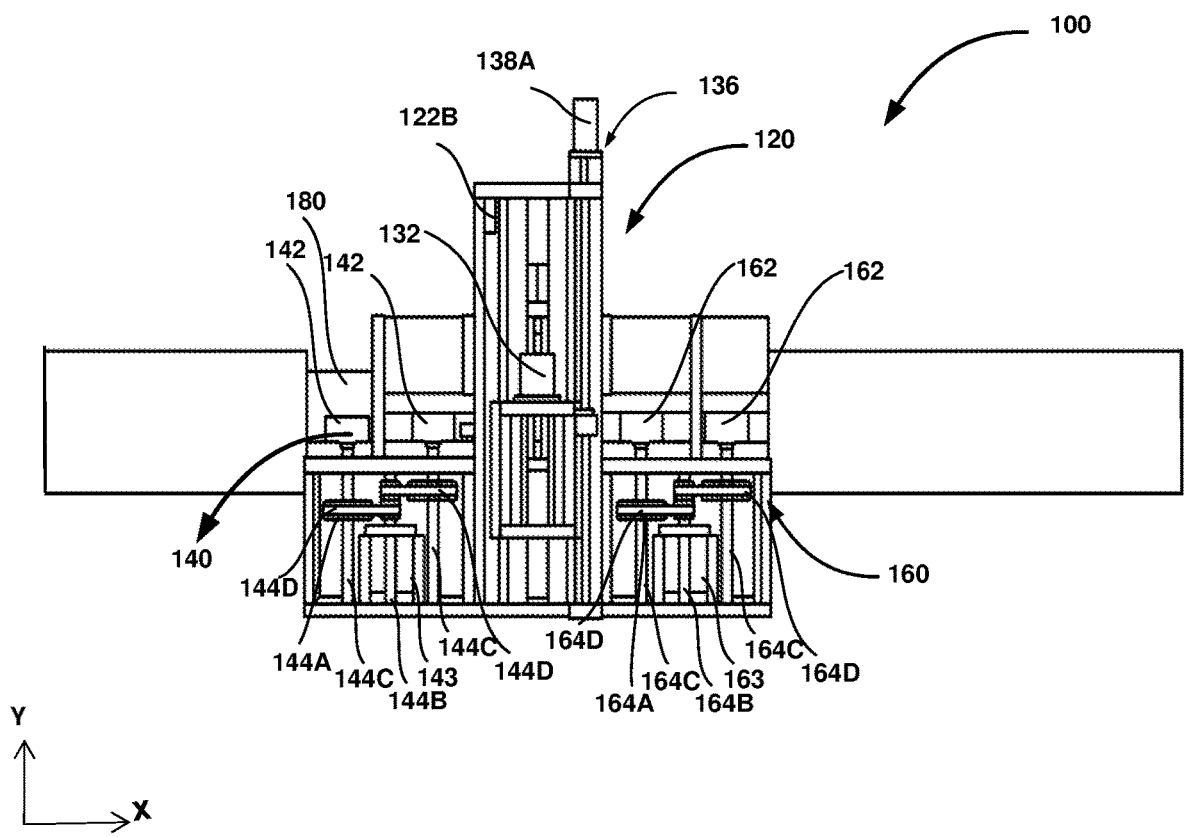
FIG. 4 is a back view of a controller-based machine tool system, according to an embodiment of the present invention.

Reference is initially made to FIGS. 1-6 that illustrates a front perspective view, a back perspective view, a top view, a back view, a front view, and a side view of a controller-based machine tool system respectively, according to an embodiment of the present invention. As shown in FIGS. 1-2, the controller-based machine tool system is positioned in an X-Y-Z axis space defined by three orthogonal axes (X-axis, Y-axis, and Z-axis). In an embodiment as shown in FIGS. 1-6, the controller-based machine tool system is configured for machining a flat elongated workpiece 10 wherein the flat elongated workpiece 10 is a wood slat architectural panel 10. However, it should be understood that the flat elongated workpiece 10 could be any object capable of being machined using the controller-based machine tool system and the object could include but not limited to: aluminium panels, steel slabs, wooden sheets, plastic sheets, and so on. The flat elongated workpiece 10 has a general flat profile and the flat elongated workpiece 10 comprises a leading edge 12 and a trailing edge 14 disposed on the opposite side.

The controller-based machine tool system comprises a computer numerical controlled (CNC) router 100 and a controller 200 (not shown in figures), which will be described in greater detail in below description. The computer numerical controlled (CNC) router 100 comprises a tool assembly 120, an infeed station 140 and an outfeed station 160, and a frame body 180, the entirety of which will be described in greater detail in below description.

Figure 5:
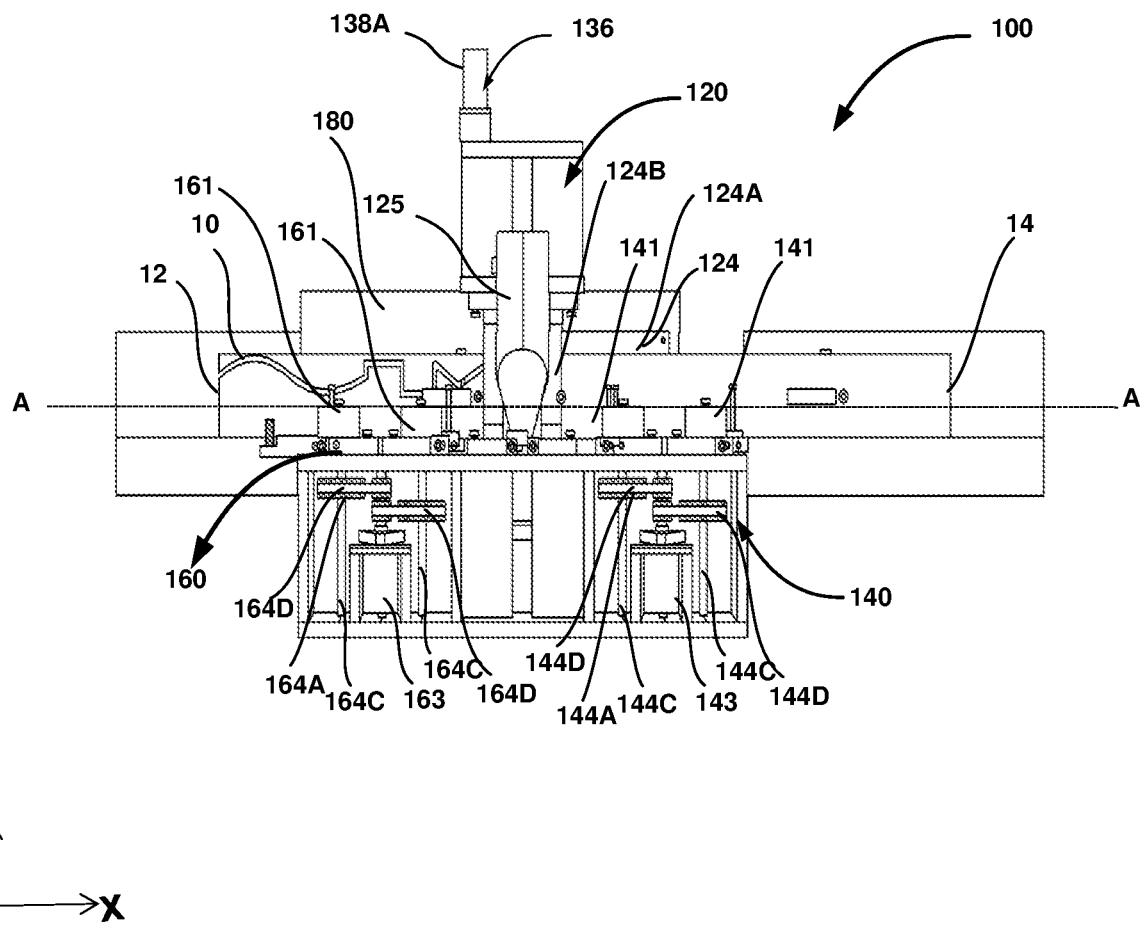
FIG. 5 is a front view of a controller-based machine tool system, according to an embodiment of the present invention.
Figure 6:
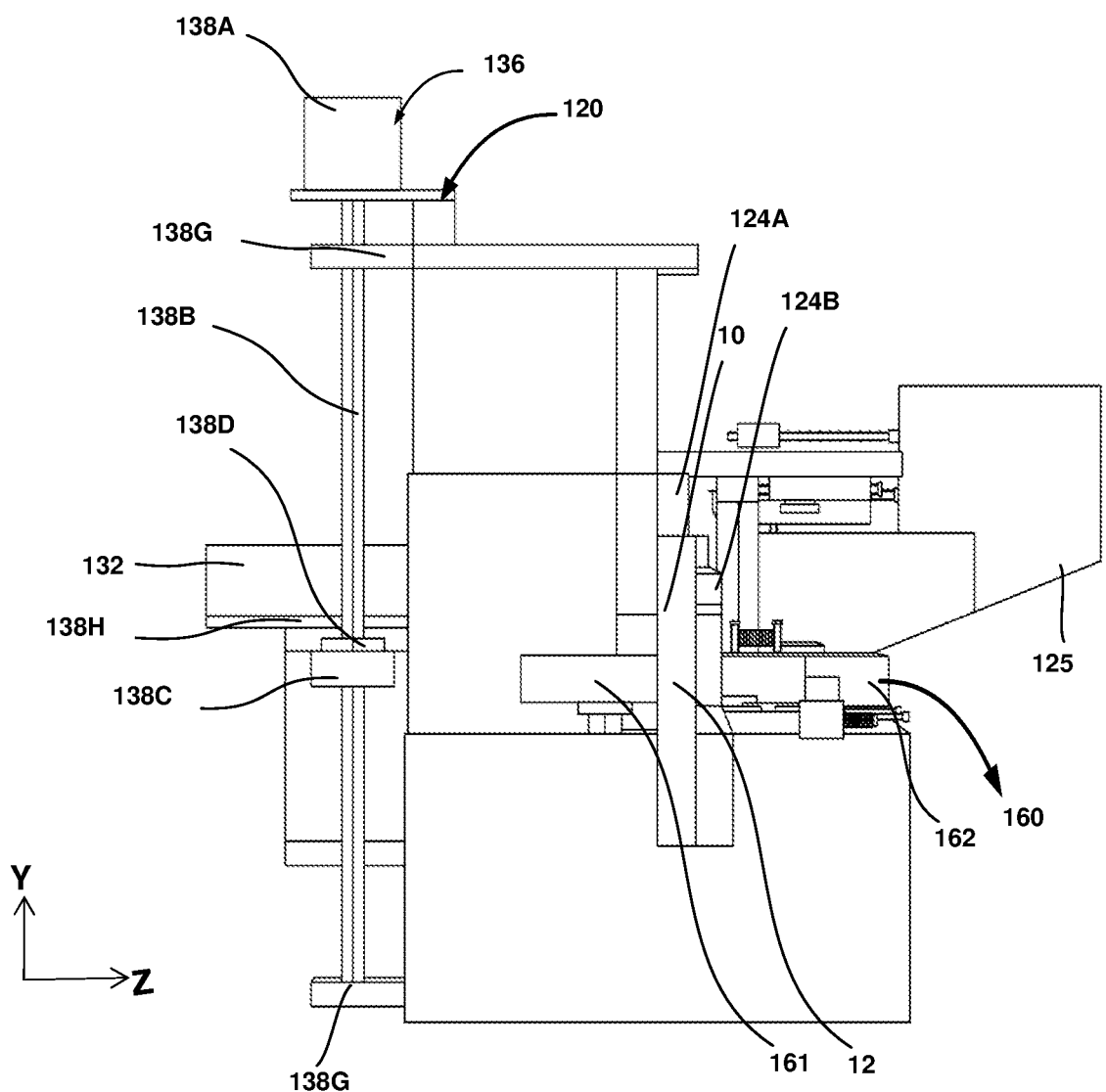
FIG. 6 is a side view of a controller-based machine tool system, according to an embodiment of the present invention.

Referring to FIGS. 1-6, the tool assembly 120 is positioned between the infeed station 140 and the outfeed station 160. The tool assembly 120 is configured for machining a customized design pattern in the flat elongated workpiece 10. The customized design pattern in the flat elongated workpiece 10 could have any shape such as including but not limited to: Zigzag, curvilinear shape, and so on. In an embodiment as seen in FIG. 1 and FIG. 5, the customized design pattern in the flat elongated workpiece 10 (FIG. 1) is curvilinear in nature. The infeed station 140 is configured to linearly move a flat elongated workpiece 10 along X-axis in a substantially linear passage away towards the tool assembly 120. The outfeed station 160 is configured to linearly move a flat elongated workpiece 10 along X-axis in a substantially linear passage away from the tool assembly 120. The flat elongated workpiece 10 is configured for linear movement along X-axis in a substantially linear passage wherein the linear passage extends through the infeed station 140, the tool assembly 120, and the outfeed station 160.

Figure 7:
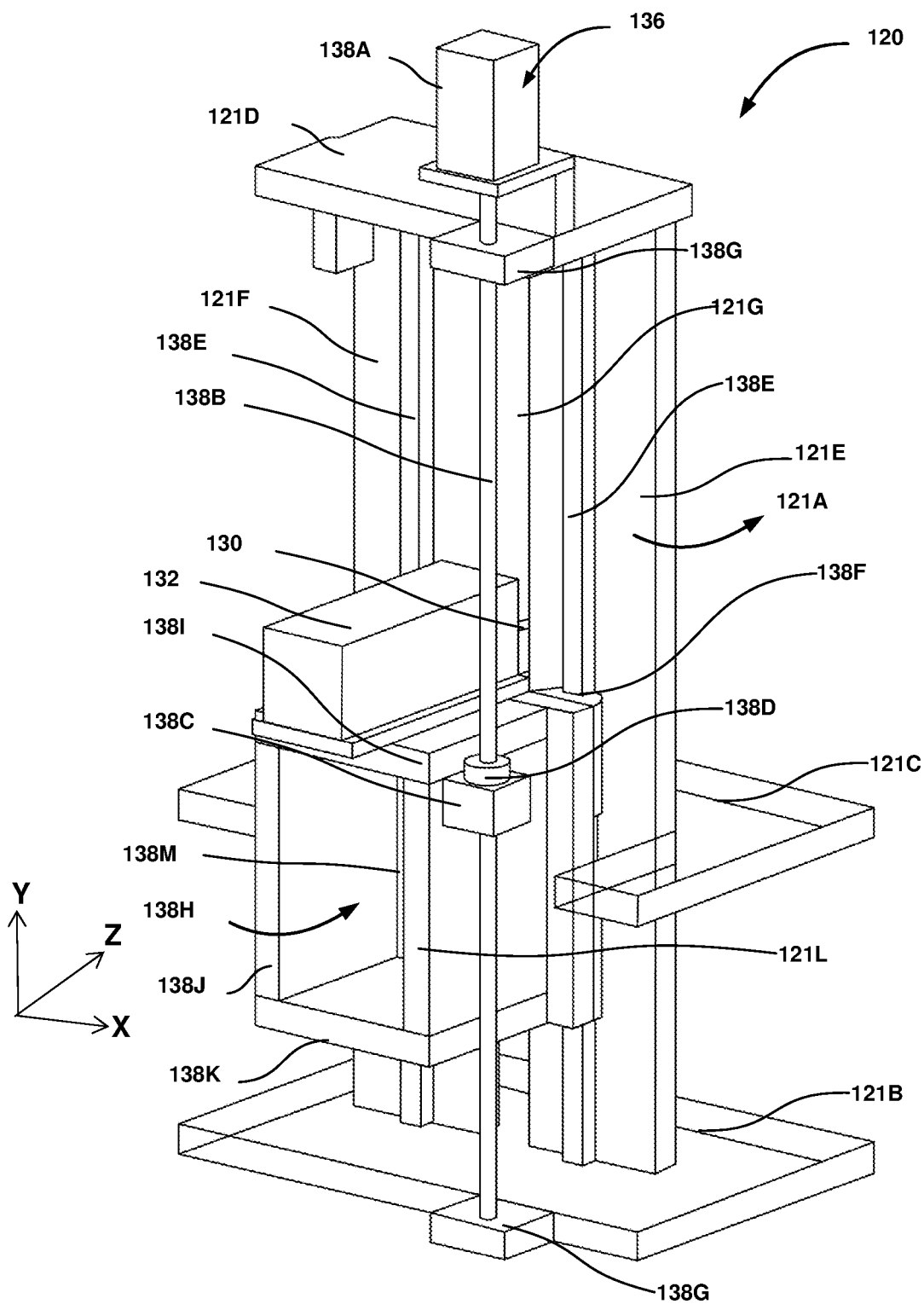
FIG. 7 is a back perspective view of a tool assembly of the controller-based machine tool system of FIGS. 1-6.

Referring to FIG. 7, the tool assembly 120 comprises a spindle 130 configured to be rotated in Z axis for machining a customized design pattern in the flat elongated workpiece 10 (FIG. 1). The spindle 130 includes a sharp cutting surface that is configured to engage against the flat elongated workpiece 10 (FIG. 1) and thus, perform machining of the flat elongated workpiece 10 (FIG. 1). A spindle motor 132 is mechanically coupled to the spindle 130 and the spindle motor 132 is configured to provide rotational power to the spindle 130. A power assembly 136 is configured to provide linear movement of the spindle 130 along the Y-axis. In an embodiment as shown in FIG. 7, the power assembly 136 comprises a motor-controlled power screw assembly 138. The motor-controlled power screw assembly 138 comprises a Y-axis motor 138A, a power screw 138B, a mounting block 138C, a power screw nut 138D, a linear rail arrangement 138E comprising a plurality of slide rails, a bearing element 138F, a plurality of power screw end supports 138G, and a slidable carriage 138H. The Y-axis motor 138A is configured to provide rotational power to the power screw 138B. The Y-axis motor 138A is bidirectional in nature such that the power screw 138B can rotate in two directions i.e clockwise direction and counter-clockwise direction. A plurality of power screw end supports 138G are positioned on opposite sides of the power screw 138B to provide rotational support to the power screw 138B. The power screw 138B is configured to convert the rotary motion of the Y-axis motor 138A into the linear movement of the power screw nut 138D along the Y-axis. The power screw nut 138D is coupled to the mounting block 138C. The mounting block 138C is further coupled to the slidable carriage 138H. A linear rail arrangement 138E is positioned on an elongate vertical frame element 121A the tool assembly 120. The slidable carriage 138H comprises a bearing element 138F that is configured to engage against the linear rail arrangement 138E of the elongate vertical frame element 121A. In an embodiment as seen in FIG. 7, the slidable carriage 138H is formed by interconnecting four sidewall plates designated as 138I, 138J, 138K, and 138L. The spindle motor 132 is positioned on the top of a sidewall plate 138I.

The tool assembly 120 further comprises a tool frame 121 that is rigid and stationary in nature. The tool frame 121 comprises an elongate vertical frame element 121A configured to facilitate sliding movement of the slidable carriage 138H, a lower frame element 121B defining a lowermost position (end position) of the slidable carriage 138H, an intermediate frame element 121C defining a portion of linear passage for the linear movement of the flat elongated workpiece 10 (FIG. 1) and a motor mounting frame element 121D to enable the mounting of the Y-axis motor 138A. The elongate vertical frame element 121A is formed of two vertical plates 121E and 121F that are spaced apart at a sufficient distance to define a vertical Y-axis channel 121G for linear movement of the spindle 130 along the Y-axis. The lower frame element 121B further acts as a stationary bed and supports the mounting of various other components of the tool assembly 120.

In another embodiment (not shown in figures), an additional second spindle motor 132' (not shown in figures) is arranged in a cavity 138M formed by the four sidewall plates designated as 138I, 138J, 138K, and 138L. The advantage of the two spindle motors designated as first spindle motor 132 and second spindle motor 132' (not shown in figures) is that the first spindle motor 132 could be configured for rough machining of the flat elongated workpiece 10 (FIG. 1) and the second spindle motor 132' (not shown in figures) could be configured for providing surface finishing effect (surface smoothening) of the roughly machined flat elongated workpiece 10 (FIG. 1).

When the Y-axis motor 138A is actuated in a first direction (clockwise direction), the power screw 138B is rotated in a first direction (clockwise direction), and the power screw nut 138D linearly moves along Y-axis in a first direction (upward motion). The mounting block 138C coupled to the power screw nut 138D also linearly moves along Y-axis in a first direction (upward motion). The slidable carriage 138H coupled to the power screw nut 138D is also forced to linearly move along Y-axis in a first direction (upward motion). The slidable carriage 138H slides against the linear rail arrangement 138E and linearly moves along Y-axis in a first direction (upward motion). A spindle motor 132 is positioned on the top of a sidewall plate 138I of the slidable carriage 138H. The spindle motor 132 is mechanically coupled to the spindle 130 and the spindle motor 132 is configured to provide rotational power to the spindle 130. Thus, the actuation of the Y-axis motor 138A in a first direction (clockwise direction) is configured to linearly move the spindle 130 along Y-axis in a first direction (upward motion) and vice-versa.

In an embodiment as seen in FIG. 7, the power assembly 136 includes a power screw 138B wherein the power screw 138B could be selected from the group comprising of lead screw, ball screw, roller screw, and so on.

In another embodiment (not shown in figures), the power assembly 136 includes a linear actuator (not shown in figures) that is capable of providing linear motion of the spindle 130. The linear actuator (not shown in figures) could include but is not limited to rack and pinion gear actuator, cam actuator, hydraulic actuator, pneumatic actuator, piezoelectric actuator, an electro-mechanical actuator, linear motors, telescoping linear actuator, piston-cylinder actuator and so on.

It should be understood that the power assembly 136 could comprise a plurality of linear actuators that are capable of providing linear motion of the spindle 130. For instance, in an exemplary embodiment (not shown in figures), the power assembly 136 comprises a motor-controlled power screw assembly 138 as well as a linear actuator (not shown in figures) in the form of a piston-cylinder actuator (not shown in figures). The advantage of dual-powered power assembly 136 is that the dual powered power assembly 136 allows for the installation of a larger size (increased weight) of the spindle motor 132.

The tool assembly 120 comprises a workpiece hold down assembly 124 to effectively clamp the flat elongated workpiece 10 while the flat elongated workpiece 10 is linearly moving along an X-axis in a substantially linear passage. The workpiece hold down assembly 124 is configured to allow linear movement of the flat elongated workpiece 10 while the workpiece hold down assembly 124 to effectively clamp the flat elongated workpiece 10. The workpiece hold down assembly 124 is configured to provide stability to the flat elongated workpiece 10 while the flat elongated workpiece 10 is being machined by the spindle 130 to ensure smooth machining operation. The workpiece hold down assembly 124 comprises a Y-axis hold down assembly 124A to prevent the flat elongated workpiece 10 from moving in the Y-axis and a Z-axis hold down assembly 124B to prevent the flat elongated workpiece 10 from moving in the Z-axis. The Y-axis hold down assembly 124A and Z-axis hold down assembly 124B could be constructed using static low-friction materials, or with rolling materials. In an embodiment, the Y-axis hold down assembly 124A and Z-axis hold down assembly 124B could apply pressure against the flat elongated workpiece 10 while the flat elongated workpiece 10 is linearly moving along an X-axis using spring-based actuators (not shown in figures) or pneumatic/hydraulic assemblies (not shown in figures).

Referring to FIGS. 1-6, the tool assembly 120 further comprises a spindle control unit 131 (not shown in figures) that is configured for controlling a power assembly 136. The tool assembly 120 further comprises a trigger switch mechanism 122 that is electrically connected to the spindle control unit 131 (not shown in figures). The trigger switch mechanism 122 is configured to be activated upon detecting a leading edge 12 of the flat elongated workpiece 10 with the trigger switch mechanism 122.

In an embodiment, the trigger switch mechanism 122 includes a limit switch 122A (not shown in figures) that is configured to be activated upon mechanical contact of a leading edge 12 of the flat elongated workpiece 10 with the trigger switch mechanism 122. In another embodiment, the the trigger switch mechanism 122 comprises a board location sensor 122B that is configured to detect the leading edge 12 of the flat elongated workpiece 10 in a non-contact manner. The sensor could be having any type such as but not limited to: displacement sensor, laser sensor, proximity sensor, magnetic sensor, ultrasonic sensor, infrared sensors and so on.

In other embodiments (not shown in figures), the trigger switch mechanism 122 could include a variety of mechanisms to mechanically detect the leading edge the trigger switch mechanism 12 of the flat elongated workpiece 10 and the mechanisms could include but not be limited to: cam mechanism, lever mechanism, roller mechanism, plunger mechanism, ratchet wheel mechanism and so on.

The trigger switch mechanism 122 is configured to be activated upon sensing leading edge 12 of the flat elongated workpiece 10 with the trigger switch mechanism 122. The activation of the trigger switch mechanism 122 enables a workpiece hold down assembly 124 to effectively clamp against the flat elongated workpiece 10 while the flat elongated workpiece 10 is linearly moving along X-axis in a substantially linear passage. The activation of the trigger switch mechanism 122 is configured to enable the spindle control unit 131 (not shown in figures) to control the power assembly 136 and linearly move the spindle 130 along y-axis in a pattern that corresponds to the customized design pattern generated in the controller 200 (not shown in figures) for machining the flat elongated workpiece 10 linearly moving along X-axis in a substantially linear passage; thereby providing a customized flat elongated workpiece 10.

The tool assembly 120 further comprises a dust-collection fitting 125 that is configured for collecting debris (chips) arising from the machining of the flat elongated workpiece 10. In an embodiment, the dust-collection fitting 125 could be connected to a waste collection system (not shown in the figures). In another embodiment, the dust-collection fitting 125 could be connected to a suction hood pipe for efficient removal of debris (chips) from the controller-based machine tool system.

Figure 8:
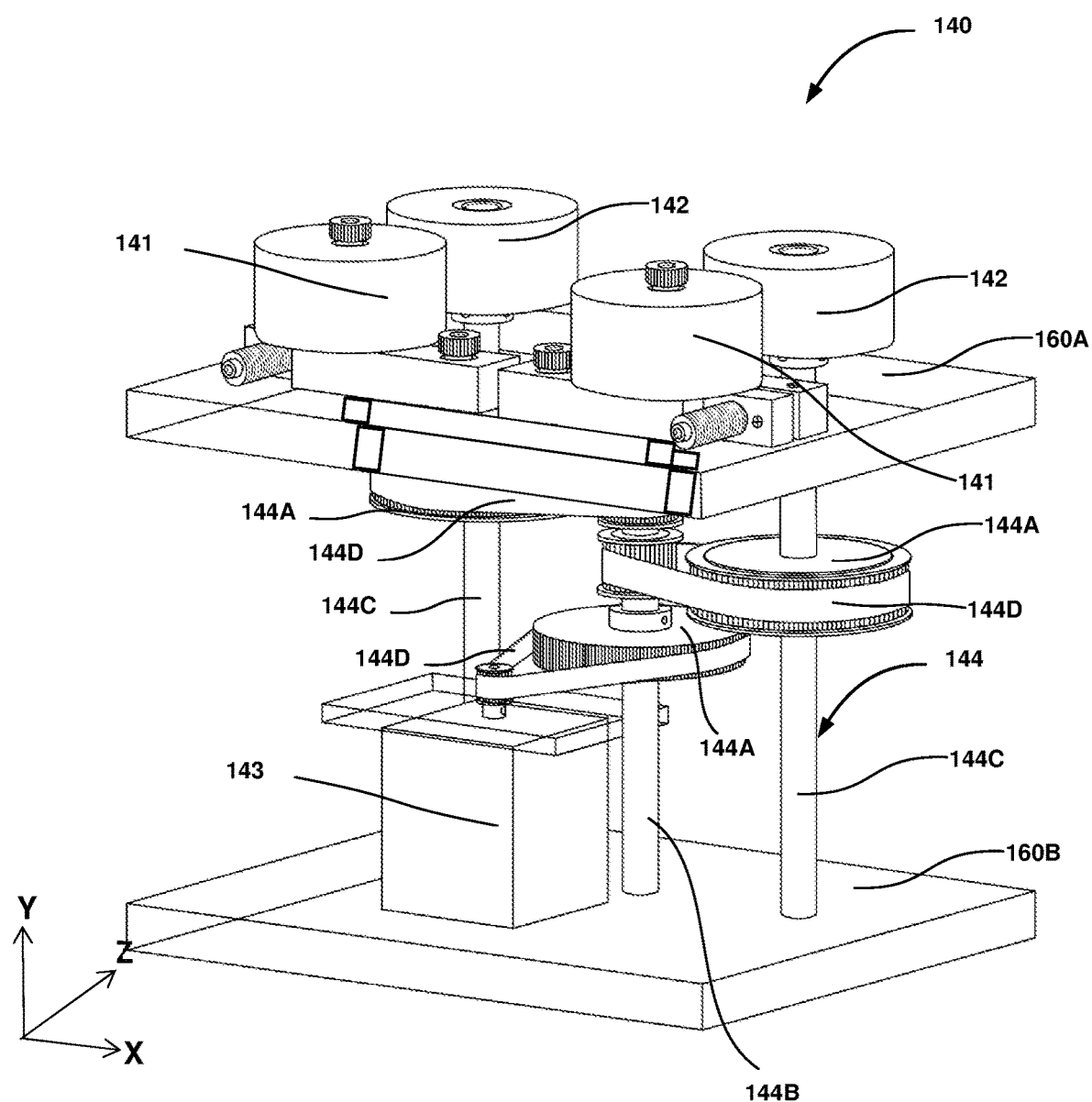
FIG. 8 is a front perspective view of an infeed station of the controller-based machine tool system of FIGS. 1-6.

Referring to FIG. 8, an infeed station 140 is configured to linearly move a flat elongated workpiece 10 (FIG. 1) along X-axis in a substantially linear passage towards the tool assembly 120 (FIGS. 1-6); wherein the infeed station 140 comprises a plurality of rollers 142 rotating along Y-axis. Further, the infeed station 140 comprises a plurality of spring-loaded idler wheels 141. The plurality of rollers 142 and the plurality of spring-loaded idler wheels 141 are spaced apart at a distance (gap) to receive a flat elongated workpiece 10. The plurality of rollers 142 of the infeed station 140 are rotationally driven by an electric motor 143. A transmission arrangement 144 mechanically couples the electric motor 143 to a plurality of rollers 142 to enable rotation of the plurality of rollers 142 when the electric motor 143 is actuated. In an embodiment as seen in FIG. 8, the transmission arrangement 144 comprises a plurality of rotating elements 144A, a primary driveshaft 144B, a plurality of secondary driveshafts 144C, and a plurality of connecting elements 144D. The primary driveshaft 144B is rotationally coupled to the electric motor 143 by using a rotating element 144A and a connecting element 144D. The primary driveshaft 144B is further rotationally coupled to the plurality of secondary driveshafts 144C by using a rotating element 144A and a plurality of connecting elements 144D. Each of the secondary driveshaft 144C is coupled with a roller 142. The infeed station 140 further comprises a top frame element 140A that defines a portion of linear passage for the linear movement of the flat elongated workpiece 10. The infeed station 140 further comprises a bottom frame element 140B that acts as stationary bed and supports mounting of various other components of the infeed station 140.

The plurality of rotating elements 144A could include any element capable of being rotated by the electric motor 143 and the plurality of rotating elements 144A could include but not limited to: gear, wheel, pulley, chain drive and so on. The connecting element 144C could include any element capable of transmitting motion between the rotating element 144A and the plurality of secondary driveshafts 144C and/or the the rotating element 144A and the electric motor 143. The connecting element 144C could include but not limited to: gear, chain, belt, rope and so on.

Figure 9:
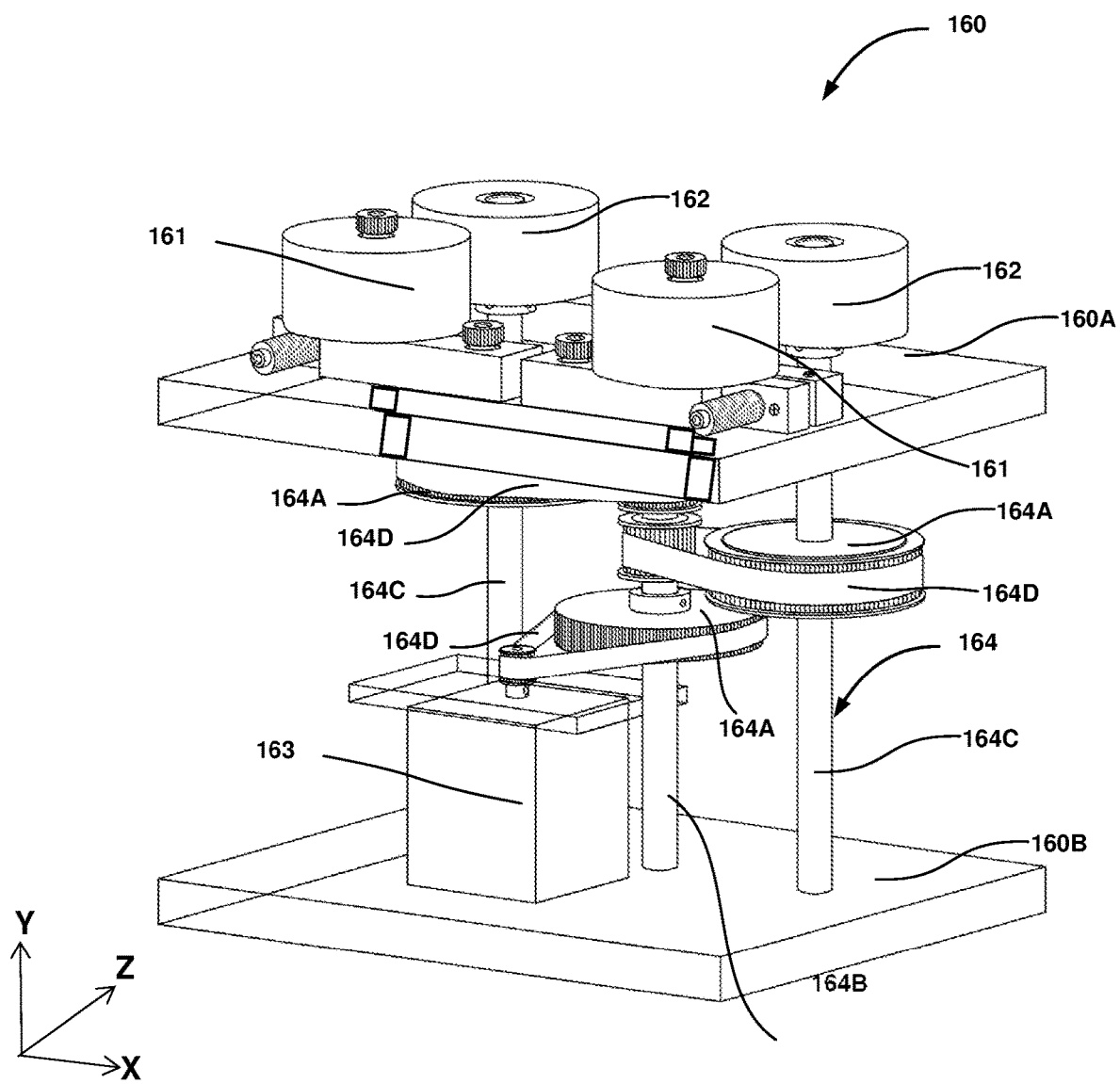
FIG. 9 is a front perspective view of an outfeed station of the controller-based machine tool system of FIGS. 1-7.

Referring to FIG. 9, an outfeed station 160 is configured to linearly move an flat elongated workpiece 10 along X-axis in a substantially linear passage away from the tool assembly 120 (FIGS. 1-6); wherein the outfeed station 160 comprises a plurality of rollers 162 rotating along Y-axis. Further, the outfeed station 160 comprises a plurality of spring-loaded idler wheels 161. The plurality of rollers 162 and the plurality of spring-loaded idler wheels 161 are spaced apart at a distance (gap) to receive a flat elongated workpiece 10. The plurality of rollers 162 of the outfeed station 160 are rotationally driven by an electric motor 163. A transmission arrangement 164 couples the electric motor 163 to a plurality of rollers 162 to enable rotation of the plurality of rollers 162 when the electric motor 163 is actuated. In an embodiment as seen in FIG. 8, the transmission arrangement 164 comprises a plurality of rotating elements 164A, a primary driveshaft 164B, a plurality of secondary driveshafts 164C, and a plurality of connecting elements 164D. The primary driveshaft 164B is rotationally coupled to the electric motor 163 by using a rotating element 164A and a connecting element 164D. The primary driveshaft 164B is further rotationally coupled to the plurality of secondary driveshafts 164C by using a rotating element 164A and a plurality of connecting elements 164D. Each of the secondary driveshaft 164C is coupled with a roller 162. The outfeed station 160 further comprises a top frame element 160A that defines a portion of linear passage for the linear movement of the flat elongated workpiece 10. The outfeed station 160 further comprises a bottom frame element 160B that acts as stationary bed and supports mounting of various other components of the outfeed station 160.

The plurality of rotating elements 164A could include any element capable of being rotated by the electric motor 163 and the plurality of rotating elements 164A could include but not limited to: gear, wheel, pulley, chain drive and so on. The connecting element 164C could include any element capable of transmitting motion between the rotating element 164A and the plurality of secondary driveshafts 164C and/or the the rotating element 164A and the electric motor 163. The connecting element 164C could include but not limited to: gear, chain, belt, rope and so on.

It should be understood that the infeed station 140 and the outfeed station 160 are quite similar in design and both of the infeed station 140 and the outfeed station 160 are configured to linearly move a flat elongated workpiece 10 along X-axis in a substantially linear passage. The only difference between the infeed station 140 and the outfeed station 160 is in terms of functionality wherein the infeed station 140 is configured to linearly move a flat elongated workpiece 10 along the X-axis in a substantially linear passage towards the tool assembly 120 (FIGS. 1-6) for machining of the flat elongated workpiece 10; and wherein the outfeed station 160 is configured to linearly move the customized (machined) flat elongated workpiece 10 along X-axis in a substantially linear passage away from the tool assembly 120 (FIGS. 1-6) for later use and/or storage of the customized (machined) flat elongated workpiece 10. Further, it should be understood that the number of rotating elements 144A and/or the number of rotating elements 164A could be any arbitrary number set equal to or larger than one in number. Further, it should be understood that the mounting position of the rotating elements 144A and/or mounting position of the of rotating elements 164A could have different layouts/configurations depending on the requirements of the machine operator.

As shown in FIG. 8 and FIG. 9, the infeed station 140 and the outfeed station 160 comprises a plurality of spring-loaded idler wheels 141 and a plurality of spring-loaded idler wheels 161 respectively. The plurality of spring-loaded idler wheels 141 and the plurality of spring-loaded idler wheels 161 are not mechanically coupled to the electric motor 143 and the electric motor 163 respectively. In an embodiment, the plurality of spring-loaded idler wheels 141 and/or the plurality of spring-loaded idler wheels 161 are at least partially rotatable in nature due to inertia (force) carried by the flat elongated workpiece 10. The plurality of spring-loaded idler wheels 141 and the plurality of spring-loaded idler wheels 161 serves the purpose of proving a rotatable bearing (contact) surface to enable the linear movement of the flat elongated workpiece 10 along the X-axis in a substantially linear passage. Further, the plurality of spring-loaded idler wheels 141 and the plurality of spring-loaded idler wheels 161 provides sufficient tightening effect for the flat elongated workpiece 10 to effectively move the flat elongated workpiece 10 along X-axis by bringing the flat elongated workpiece 10 in close contact with the plurality of rollers 142 and/or plurality of rollers 162. Thus, the plurality of spring-loaded idler wheels 141 and the plurality of spring-loaded idler wheels 161 maintains a sufficient distance (gap) between the: plurality of spring-loaded idler wheels 141 and the plurality of rollers 142, and the plurality of spring-loaded idler wheels 161 and the plurality of rollers 162.

In another embodiment (not shown in figures), the infeed station 140 and the outfeed station 160 comprise a plurality of spring-loaded slider surfaces 141' (not shown in figures) and the plurality of spring-loaded slider surfaces 161' (not shown in figures) respectively. The plurality of spring-loaded slider surfaces 141' (not shown in figures) and the plurality of spring-loaded slider surfaces 161' (not shown in figures) serves the purpose of proving a slidable bearing (contact) surface to enable the linear movement of the flat elongated workpiece 10 along X-axis in a substantially linear passage.

It should be understood that the plurality of flat elongated workpieces 10 could be arranged in the infeed station 140 by any conventional means known in the art such as manual loading of flat elongated workpieces 10 or automatic loading such as roll lines, conveyor belts, cranes, hoist mechanisms and so on.

In another embodiment (not shown in figures), the plurality of flat elongated workpieces 10 are initially placed in an automatic magazine loader (not shown in figures) wherein the automatic magazine loader (not shown in figures) sequentially (one-by-one) feeds a flat elongated workpiece 10 in the infeed station 140. Similarly, in another embodiment (not shown in figures), the plurality of customized flat elongated workpieces 10 are finally placed in an automatic magazine loader (not shown in figures) wherein the automatic magazine loader (not shown in figures) sequentially receives (one-by-one) a flat elongated workpiece 10 from the outfeed station 160.

It should be understood that the electric motor 163 of the outfeed station 160, the electric motor 143 of the infeed station 140, the Y-axis motor 138A of the power assembly 136 as well as the spindle motor 132 of the tool assembly could be any motor type known in the art such as but not limited to: stepper motor, servo motor, DC motor, AC motor and so on depending on the application requirement of the machine operator.

The frame body 180 defines the framework (skeleton structure) of the computer numerical controlled (CNC) router 100. The frame body 180 includes a plurality of walls and/or beams interconnected to define the overall stationary shape and structure of the computer numerical controlled (CNC) router 100. The material of the frame body 180 is rigid and sturdy in nature to withstand the machining operation and support various loads (weights) associated with the computer numerical controlled (CNC) router 100. The material for the frame body 180 could include but is not limited to: aluminium, iron, steel, metal alloys, and so on.

The controller 200 (not shown in the figures) will now be described in detail. The controller 200 (not shown in figures) is electrically connected to the spindle control unit 131 (not shown in figures) of the tool assembly 120, the trigger switch mechanism 122 of the tool assembly 120, the workpiece hold-down assembly 124 of the tool assembly 120, the infeed station 140 and the outfeed station 160. The controller 200 (not shown in the figures) is configured to generate a customized design pattern for the flat elongated workpiece 10. The controller 200 (not shown in figures) could include any electrical component that is configured to receive inputs from an input unit 210 (not shown in figures) and then, performs computing task in a processor unit 220 (not shown in figures) and then provides an output corresponding to a customized design pattern for the flat elongated workpiece 10 using an output unit 230 (not shown in figures). In an embodiment, the controller 200 (not shown in figures) is could be accessed using a computing device such as but not limited to: a computer, laptop, mobile phone, Personal digital assistant, tablet, and so on.

The input unit 210 (not shown in figures) could include a user interface (not shown in figures) such as but not limited to: keyboard, joystick, mouse and so on such that the machine operator can manually provide their inputs corresponding to the customized design pattern for the flat elongated workpiece 10. Further, the input unit 210 (not shown in the figures) could include an external interface for uploading data corresponding to the customized design pattern for the flat elongated workpiece 10 from a third-party source. The external interface could include but is not limited to Wireless connection, Universal serial bus (USB) port, Local Area Network (LAN), internet, Bluetooth, disc drive, and so on.

The processor unit 220 (not shown in figures) could include a custom design software that imports a digital surface that represents the customized design pattern to be revealed in the final installation, along with curves that define panel boundaries. The digital surface can be a single (but complex) surface such that the digital surface does not have to indicate the individual flat elongated workpiece 10 in the final system. This greatly reduces the design burden on the machine operator who is developing the pattern for the plurality of flat elongated workpiece 10. The custom design software includes already stored customized design patterns for the flat elongated workpiece 10. The custom design software allows the machine operator to rapidly adjust variables for the flat elongated workpiece 10 size and spacing by using the user interface (not shown in figures) of the input unit 210 (not shown in figures). With these inputs, the custom design software can be executed (run) to quickly and automatically generate a number of digital resources (documentation), including:

(a) 3D DOCUMENTATION: A 3-dimensional model of each flat elongated workpiece 10 in this system, with alphanumeric naming based on the flat elongated workpiece 10 location. This geometry is automatically placed on layers with matching alphanumeric labeling. This drastically reduces the time to create and organize a 3D model.

(b) 2D DOCUMENTATION: 2-dimensional shop drawings for each flat elongated workpiece 10 in the customized flat elongated workpiece system. A unique drawing sheet is generated for each flat elongated workpiece 10, and includes an elevation view of the flat elongated workpiece 10, and profile views for each flat elongated workpiece 10. The drawing includes the automatically assigned alphanumeric labels for each flat elongated workpiece 10, as well as dimensions for each flat elongated workpiece 10. This drastically reduces time to create shop drawings, and (c) MACHINE DOCUMENTATION-Machine control files, automatically generated for each flat elongated workpiece 10 with a file naming convention that matches the alphanumeric labels for each flat elongated workpiece 10. These files are programmed to be executed (run) in the controller-based machine tool system.

The output unit 230 (not shown in the figures) is electrically connected to the trigger switch mechanism 122. The output unit 230 (not shown in figures) is configured to output machine control files, automatically generated for each flat elongated workpiece 10 by the processor unit 220 (not shown in figures). The output unit 230 (not shown in figures) is electrically connected to the spindle control unit 131 (not shown in figures) of the tool assembly 120, the trigger switch mechanism 122 of the tool assembly 120, the workpiece hold down assembly 124 of the tool assembly 120, the infeed station 140 and the outfeed station 160. The output unit 230 (not shown in figures) is electrically connected to the trigger switch mechanism 122 of the tool assembly 120 and the output unit 230 (not shown in figures) electrically controls the spindle control unit 131 (not shown in figures) of the tool assembly 120, the workpiece hold down assembly 124 of the tool assembly 120, the infeed station 140 and the outfeed station 160 to thereby generate a customized design pattern for the flat elongated workpiece 10.

Figure 10:
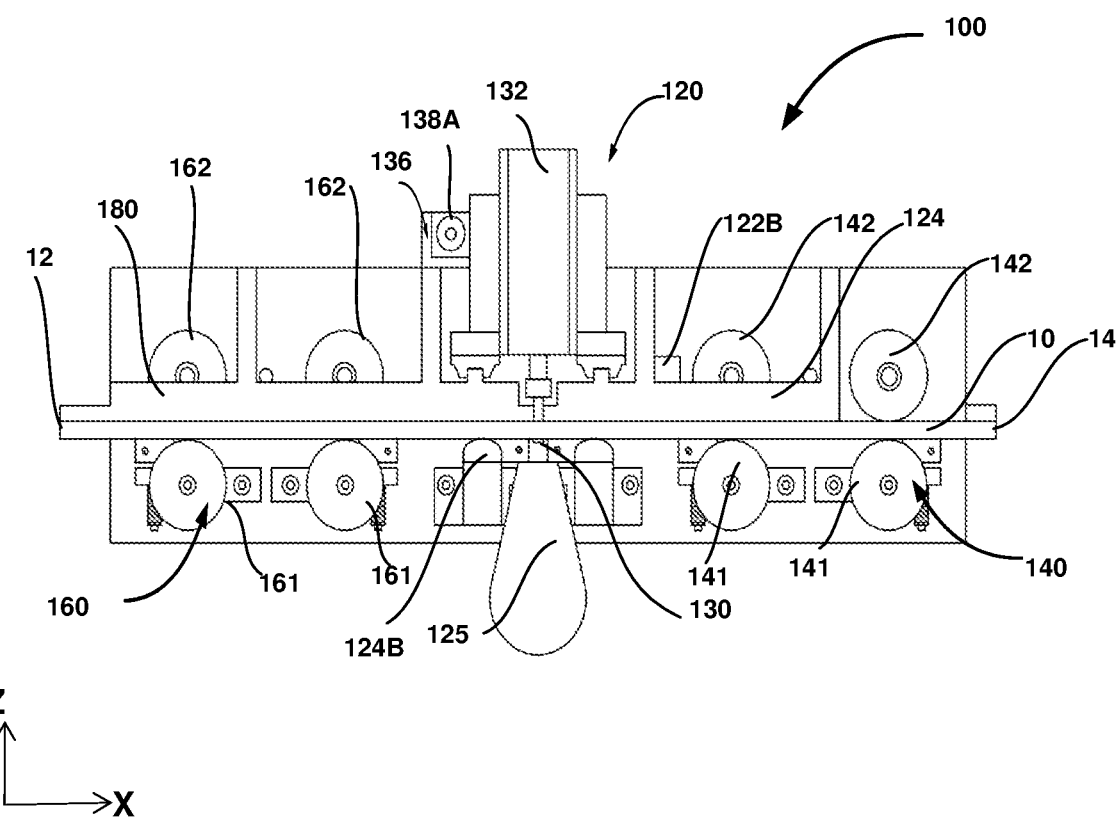
FIG. 10 is a sectional top view of the controller-based machine tool system taken along imaginary line A-A of FIG. 5.

Referring to FIG. 10, a sectional top view of the controller-based machine tool system taken along imaginary line A-A of FIG. 5 will be described. As shown in FIG. 10, the spindle 130 rotating around Z-axis is machining a customized design pattern in the flat elongated workpiece 10 wherein the flat elongated workpiece 10 is linearly moving along X-axis in a substantially linear passage wherein the linear passage extends through the infeed station 140, the tool assembly 120 and the outfeed station 160.

An exemplary process for obtaining a customized flat elongated workpiece 10 will now be described in multiple steps (Step (A)-Step (J)) in reference to FIG. 1-10.

Step (A): A custom design software of the processor unit 220 (not shown in figures) is executed to generate a customized design pattern for the flat elongated workpiece 10 in the processor unit 220 (not shown in figures). Once the custom design software is executed (run), the useful digital resources (documentation) produced in the custom design software can be exported. The 3D documentation and 2D documentation can be provided to the design team for verification, the fabrication team for preparing material stock, and the machine documentation comprising the machine files is provided to the output unit 230 (not shown in figures) for machining the flat elongated workpiece 10 by using the computer numerical controlled (CNC) router 100.

Step (B): Once the material stock of the flat elongated workpiece 10 has been prepared to rough size and quantity by the fabrication team, the machine operator can begin machining the flat elongated workpiece 10 in the computer numerical controlled (CNC) router 100.

Step (C): Afterwards, a flat elongated workpiece 10 is arranged in an infeed station 140 of the computer numerical controlled (CNC) router 100.

Step (D): Afterwards, the infeed station 140 linearly moves the flat elongated workpiece 10 along X-axis in a substantially linear passage towards a tool assembly 120 of the computer numerical controlled (CNC) router 100.

Step (E): The linear movement of the flat elongated workpiece 10 along X-axis in a substantially linear passage towards the tool assembly 120 enables sensing of a leading edge 12 of the flat elongated workpiece 10 with a trigger switch mechanism 122 of the tool assembly 120; thereby activating the trigger switch mechanism 122.

Step (F): The activation of the trigger switch mechanism 122 enables the workpiece hold down assembly 124 to effectively clamp against the flat elongated workpiece 10 while the flat elongated workpiece 10 is linearly moving along X-axis in a substantially linear passage.

Step (G): The activation of the trigger switch mechanism 122 further enables the spindle control unit 131 (not shown in figures) to control the power assembly 136 and linearly move the spindle 130 along y-axis in a pattern that corresponds to the customized design pattern generated in the processor unit 220 (not shown in figures) for machining the flat elongated workpiece 10 linearly moving along X-axis in a substantially linear passage; thereby providing a customized flat elongated workpiece 10.

Step (H): Afterwards, the customized flat elongated workpiece 10 linearly moving along X-axis in a substantially linear passage is received in the outfeed station 160.

Step (I): The outfeed station 160 linearly moves the customized flat elongated workpiece 10 along X-axis in a substantially linear passage away from the tool assembly 120 for later use.

Step (J): Afterwards, another (next) flat elongated workpiece 10 is arranged in an infeed station 140 and then, the above-mentioned steps (Step (D)-Step (I)) are repeated with little to no variation for obtaining another (next) customized flat elongated workpiece 10 and so on to obtain a flat elongated workpiece system comprising a plurality of customized flat elongated workpieces 10. In a preferred embodiment, the flat elongated workpiece system is a wood slat architectural panel system.

It should be understood that the linear passage extends through the infeed station 140, the tool assembly 120 and the outfeed station 160 and the linear passage is configured for linear movement of flat elongated workpiece 10 along X-axis. Thus, the linear passage comprises a portion of an intermediate frame element 121C of the tool assembly 120 wherein the portion of an intermediate frame element 121C is positioned between the dust-collection fitting 125 and the elongate vertical frame element 121A; a portion of a top frame element 140A of the infeed station 140 wherein the portion of a top frame element 140A is positioned between the roller(s) 142 and the spring-loaded idler wheel 141; and a portion of a top frame element 160A of the outfeed station 160 wherein the portion of a top frame element 160A is positioned between the roller(s) 162 and the spring-loaded idler wheel 161.

It should be further understood that the machining of the flat elongated workpiece 10 and the customized flat elongated workpiece 10 are identically similar terms and are interchangeably used in various embodiments of present invention.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A controller-based machine tool system positioned in an X-Y-Z axis space and configured for machining a flat elongated workpiece (10), the controller-based machine tool system, comprising:
   a tool assembly (120) comprising a spindle (130) configured to be rotated around Z axis for machining a customized design pattern in the flat elongated workpiece (10); a spindle motor (132) configured to provide rotational power to the spindle (130); a power assembly (136) configured to provide linear movement of the spindle (130) along Y-axis; and a spindle control unit (131) configured for controlling the power assembly (136);
   wherein the tool assembly (120) further comprises a trigger switch mechanism (122) that is electrically connected to the spindle control unit (131); wherein the trigger switch mechanism (122) is configured to be activated upon detection of a leading edge (12) of the flat elongated workpiece (10) with the trigger switch mechanism (122);
   a controller (200) electrically connected to the spindle control unit (131); wherein the controller (200) is configured to generate a customized design pattern for the flat elongated workpiece (10);
   an infeed station (140) configured to linearly move a flat elongated workpiece (10) along X-axis in a substantially linear passage towards the tool assembly (120); wherein the infeed station (140) comprises at least one roller (142) rotating along Y-axis; and
   an outfeed station (160) configured to linearly move the flat elongated workpiece (10) along X-axis in a substantially linear passage away from the tool assembly (120); wherein the outfeed station (160) comprises at least one roller (162) rotating along Y-axis.

2. The controller-based machine tool system according to claim 1, wherein the flat elongated workpiece (10) is a wood slat architectural panel (10).

3. The controller-based machine tool system according to claim 1, wherein the power assembly (136) comprises a motor-controlled power screw assembly (138).

4. The controller-based machine tool system according to claim 3, wherein the motor-controlled power screw assembly (138) comprises a Y-axis motor (138A), a power screw (138B), a mounting block (138C), a power screw nut (138D), a linear rail arrangement (138E) comprising a plurality of slide rails, a bearing element (138F), a plurality of power screw end supports (138G), and a slidable carriage (138H).

5. The controller-based machine tool system according to claim 1, wherein the power assembly (136) comprises a linear actuator selected from a group consisting of: rack and pinion gear actuator, cam actuator, hydraulic actuator, pneumatic actuator, piezoelectric actuator, electro-mechanical actuator, linear motors, telescoping linear actuator and piston-cylinder actuator.

6. The controller-based machine tool system according to claim 1, wherein the tool assembly (120) further comprising a second spindle motor (132') configured for providing a surface finishing effect of the roughly machined flat elongated workpiece (10).

7. The controller-based machine tool system according to claim 1, wherein the tool assembly (120) comprises a dust-collection fitting (125) for collecting debris arising from machining of the flat elongated workpiece (10).

8. The controller-based machine tool system according to claim 1, wherein the trigger switch mechanism (122) comprises a board location sensor (122b) configured to detect the leading edge (12) of the flat elongated workpiece (10) in a non-contact manner.

9. The controller-based machine tool system according to claim 1, wherein the trigger switch mechanism (122) comprises a limit switch (122A) configured to mechanically contact with the leading edge (12) of the flat elongated workpiece (10).

10. The controller-based machine tool system according to claim 1, wherein the tool assembly (120) comprises a workpiece hold down assembly (124) to effectively clamp the flat elongated workpiece (10) while the flat elongated workpiece (10) is linearly moving along an X-axis in a substantially linear passage.

11. The controller-based machine tool system according to claim 1, wherein the infeed station (140) comprises at least one spring-loaded idler wheel (141).

12. The controller-based machine tool system according to claim 1, wherein the outfeed station (160) comprises at least one spring-loaded idler wheel (161).

13. The controller-based machine tool system according to claim 1, wherein the roller(s) (142) of the infeed station (140) is rotationally driven by an electric motor (143).

14. The controller-based machine tool system according to claim 1, wherein the roller(s) (162) of the outfeed station (160) is rotationally driven by an electric motor (163).

15. The controller-based machine tool system according to claim 1, wherein the controller (200) comprises an input unit (210), a processor unit (220), and the output unit (230).

16. The controller-based machine tool system according to claim 15, wherein the processor unit (220) include a custom design software that imports a digital surface that represents the customized design pattern to be revealed in the final installation, along with curves that define panel boundaries.

17. The controller-based machine tool system according to claim 16, wherein the custom design software is configured to generate a number of digital resources.

18. A customized flat elongated workpiece (10) obtained by a process comprising the steps of:
   providing a controller-based machine tool system positioned in an X-Y-Z axis space that comprises a tool assembly (120), an infeed station (140), an outfeed station (160) and a controller (200);

generating a customized design pattern for the flat elongated workpiece (10) in the controller (200);

arranging a flat elongated workpiece (10) in an infeed station (140);

enabling the infeed station (140) to linearly move a flat elongated workpiece (10) along X-axis in a substantially linear passage towards a tool assembly (120);

Wherein linear movement of the flat elongated workpiece (10) along the X-axis in a substantially linear passage towards the tool assembly (120) enables detection of a leading edge (12) of the flat elongated workpiece (10) with a trigger switch mechanism (122) of the tool assembly (120); thereby activating the trigger switch mechanism (122);

wherein the activation of the trigger switch mechanism (122) enables the workpiece hold down assembly (124) to effectively clamp against the flat elongated workpiece (10) while the flat elongated workpiece (10) is linearly moving along X-axis in a substantially linear passage;

wherein the activation of the trigger switch mechanism (122) further enables the spindle control unit (131) to control the power assembly (136) and linearly move the rotating spindle (130) along y-axis in a pattern that corresponds to the customized design pattern generated in the controller (200) for machining the flat elongated workpiece (10) linearly moving along X-axis in a substantially linear passage; thereby providing a customized flat elongated workpiece (10);

receiving the customized flat elongated workpiece (10) linearly moving along X-axis in a substantially linear passage in the outfeed station (160); and enabling the outfeed station (160) to linearly move the customized flat elongated workpiece (10) along X-axis in a substantially linear passage away from the tool assembly (120) for later use.

19. The customized flat elongated workpiece (10) obtained by a process according to claim 18, wherein the infeed station (140) comprises at least one roller (142) rotating along Y-axis.

20. The customized flat elongated workpiece (10) obtained by a process according to claim 18, wherein the outfeed station (160) comprises at least one roller (162) rotating along Y-axis.

21. The customized flat elongated workpiece (10) obtained by a process according to claim 18, wherein the flat elongated workpiece (10) is a wood slat architectural panel (10).

22. The customized flat elongated workpiece (10) obtained by a process according to claim 18, wherein the power assembly (136) comprises a motor-controlled power screw assembly (138).

23. The customized flat elongated workpiece (10) obtained by a process according to claim 22, wherein the motor-controlled power screw assembly (138) comprises a Y-axis motor (138A), a power screw (138B), a mounting block (138C), a power screw nut (138D), a linear rail arrangement (138E) comprising a plurality of slide rails, a bearing element (138F), a plurality of power screw end supports (138G), and a slidable carriage (138H).

24. The customized flat elongated workpiece (10) obtained by a process according to claim 18, wherein the power assembly (136) comprises a linear actuator selected from group consisting of: rack and pinion gear actuator, cam actuator, hydraulic actuator, pneumatic actuator, piezoelectric actuator, electro-mechanical actuator, linear motors, telescoping linear actuator and piston-cylinder actuator.

25. The customized flat elongated workpiece (10) obtained by a process according to claim 18, wherein the tool assembly (120) comprising a second spindle motor (132') configured for providing surface finishing effect of the roughly machined flat elongated workpiece (10).

26. The customized flat elongated workpiece (10) obtained by a process according to claim 18, wherein the tool assembly (120) comprises a dust-collection fitting (125) for collecting debris arising from machining of the flat elongated workpiece (10).

27. The customized flat elongated workpiece (10) obtained by a process according to claim 18, wherein the trigger switch mechanism (122) comprises a board location sensor (122b) configured to detect the leading edge (12) of the flat elongated workpiece (10) in a non-contact manner.

28. The customized flat elongated workpiece (10) obtained by a process according to claim 18, wherein the trigger switch mechanism (122) comprises a limit switch (122A) configured to mechanically contact with the leading edge (12) of the flat elongated workpiece (10).

29. The customized flat elongated workpiece (10) obtained by a process according to claim 18, wherein the infeed station (140) comprises at least one spring-loaded idler wheel (141).

30. The customized flat elongated workpiece (10) obtained by a process according to claim 18, wherein the outfeed station (160) comprises at least one spring-loaded idler wheel (161).

31. The customized flat elongated workpiece (10) obtained by a process according to claim 18, wherein the roller(s) (142) of the infeed station (140) is rotationally driven by an electric motor (143).

32. The customized flat elongated workpiece (10) obtained by a process according to claim 18, wherein the roller(s) (162) of the outfeed station (160) is rotationally driven by an electric motor (163).

33. The customized flat elongated workpiece (10) obtained by a process according to claim 18, wherein the controller (200) comprises an input unit (210), a processor unit (220) and the output unit (230).

34. The customized flat elongated workpiece (10) obtained by a process according to claim 33, wherein the processor unit (220) include a custom design software that imports a digital surface that represents the customized design pattern to be revealed in the final installation, along with curves that define panel boundaries.

35. The controller-based machine tool system according to claim 34, wherein the custom design software is configured to generate a number of digital resources.

* * * * *